Patented Nov. 20, 1934

1,981,055

UNITED STATES PATENT OFFICE 1,981,055

SULPHUR COLORS

John T. Linster, Horace B. Pray and Herbert A. Lubs, Wilmington, Del., assignors to E. I. du Pont de Nemours & Company, Wilmington, Del., a corporation of Delaware No Drawing. Application June 7, 1933, Serial No. 674,713

10 Claims. (Cl. 260—24)

This invention relates to improved sulphur dyes and more particularly refers to sulphur dyes having attractive orange shades of exceptional fastness and brilliancy.

It is an object of this invention to produce sulphur dyes, particularly in the various shades of orange, having excellent fastness to light and washing. A further object is to produce bright attractive dyes, which may be used to dye cotton directly from solutions of the dye an alkali metal sulphides. Additional objects will become apparent from a consideration of the following description.

These objects are attained according to the herein described invention, which in its preferred embodiment comprises heating a mixture containing meta-toluylene-diamine, sulphur, a dibasic acid, such as phthalic acid or its anhydride, and an amine such as benzidine.

It is well known that meta-toluylene-diamine may be fused in the presence of benzidine and and sulphur. Likewise, it is known that this diamine may be fused in the presence of phthalic acid and sulphur. U. S. Patent 688,385 discloses such a process. However, it has never, so far as we are aware, been known that greatly superior colors may be obtained by fusing meta-tolylene-diamine with sulphur, a dibasic acid, and an amine.

This invention may be more completely understood by a consideration of the following illustrative example, in which the quantities are stated in parts by weight.

Example 100 parts of meta-toluylene-diamine, 85 parts of phthalic anhydride, 1113 parts of sulphur and 150 parts of benzidine were fused at 200-290° C. for 5-20 hours or until the evolution of hydrogen sulphide ceases. The fusion mass was then cooled to a point where it was safe to add caustic soda solution. This mixture was boiled until all of the fusion mass was in solution. The solution was then filtered to remove any insoluble matter, heated, and the color precipitated by the addition of dilute sulphuric acid solution.

It is to be understood that the relative proportions of compounds used in carrying out the process of the present invention may be varied within rather wide limits without departing from the scope of this invention. Furthermore, it is understood that the fusion mass may be brought into solution by other well known means than the addition of caustic soda solution, for instance by the addition of sodium sulphide. The order and manner of mixing or adding the ingredients to the fusion may be varied, as is well known. In addition, it may here be stated that the fusion mass may be ground and used directly as a dye with or without the aid of a wetting agent, instead of bringing such mass into solution, filtering, and precipitating the dye, as was done in the aforementioned example.

As an example of other dibasic acids which may be used with satisfactory results, mention may be made of oxalic, succinic and hexahydro-phthalic acid. Wherever reference is made in the present specification or claims to a dibasic acid, it is to be understood that this term is meant to include the anhydride of such acid.

Most satisfactory results are, in general, obtained by combining meta-toluylene-diamine, phthalic acid or its anhydride, benzidine and sulphur. However, as has been heretofore stated, the invention is by no means limited to this particular combination, although it is to be understood that this combination is preferable for most purposes.

By means of the present invention sulphur dyes having very satisfactory fastness are produced. These dyes impart bright attractive shades to textile material, particularly cotton. In addition, the process described herein permits sulphur dyes having superior characteristics over those formerly known and used to be produced. Although the prior art processes use either benzidine or phthalic anhydride, it is interesting to note that the presence of both these compounds in the same combination produces surprisingly good results, as evidenced by the present discovery.

As many apparently widely different embodiments of this invention may be made without departing from the spirit and scope thereof, it is to be understood that we do not limit ourselves to the specific embodiments thereof except as defined in the appended claims.

We claim:

1. A process for producing sulphur dyes which comprises heating meta-toluylene-diamine sulphur, a dibasic carboxylic acid and an amine of the diphenyl series.

2. The process of claim 1 wherein the dibasic acid is selected from the group consisting of phthalic, oxalic, succinic and hexahydro-phthalic acids.

3. The process of claim 1 wherein the dibasic acid is selected from the group consisting of phthalic, oxalic, succinic and hexahydro-phthalic acids, and the amine is benzidine.

4. A process for producing sulphur dyes which comprises heating meta-toluylene-diamine, sulphur, benzidine and phthalic anhydride.

5. The process of claim 4 wherein the heated mass is cooled, treated with a caustic solution, heated, and then treated with a dilute mineral acid.

6. The product produced according to the process of claim 1.

7. The product produced by heating meta-toluylene-diamine, sulphur, a member selected from the group consisting of phthalic, oxalic, succinic and hexahydro-phthalic acids, and an amine of the diphenyl series.

8. The product of claim 7 wherein the amine is benzidine.

9. The product produced by heating meta-toluylene-diamine, sulphur, benzidine and phthalic anhydride.

10. The product produced by heating meta-toluylene-diamine, sulphur, benzidine and phthalic anhydride, cooling, treating with a caustic solution, heating, and then treating with a dilute mineral acid.

JOHN T. LINSTER.
HORACE B. PRAY.
HERBERT A. LUBS.